United States Patent Office 3,511,909
Patented May 12, 1970

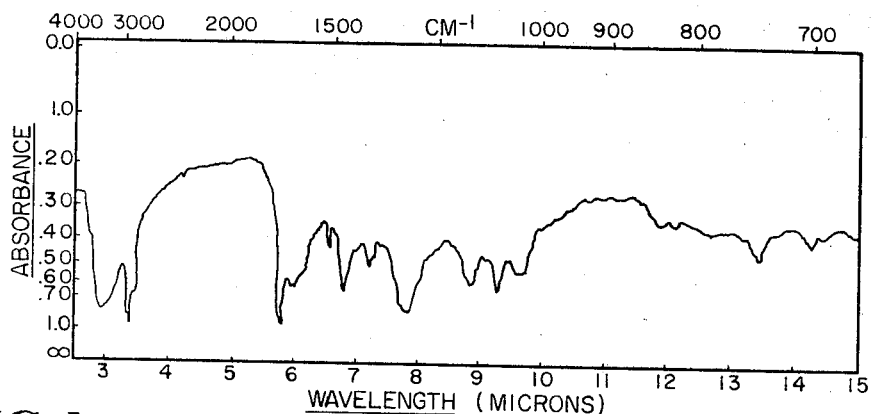
FIG.1 INFRARED ABSORPTION SPECTRUM HALOMICIN DERIVED FROM *MICROMONOSPORA* HALOPHYTICA Var. HALOPHYTICA
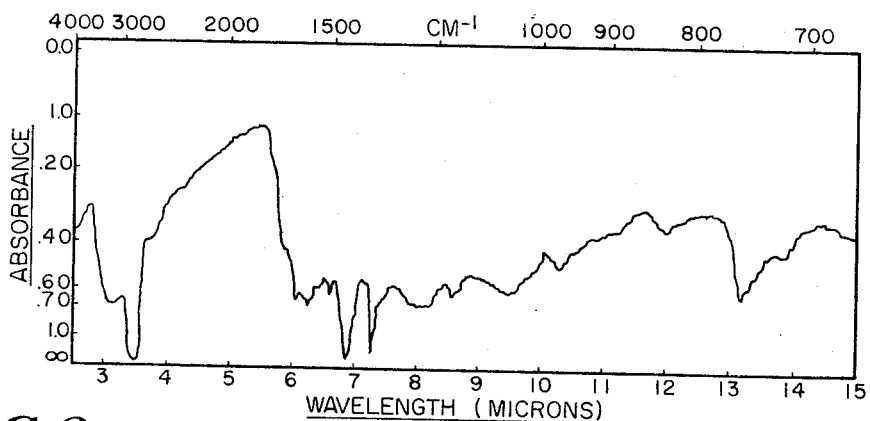
FIG.2 INFRARED ABSORPTION SPECTRUM HALOMICIN DERIVED FROM *MICROMONOSPORA* HALOPHYTICA Var. NIGRA
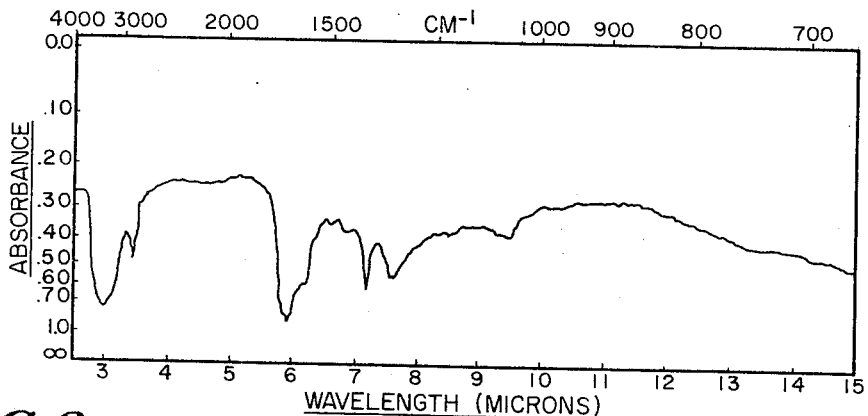
FIG.3 INFRARED ABSORPTION SPECTRUM HALOMICIN A

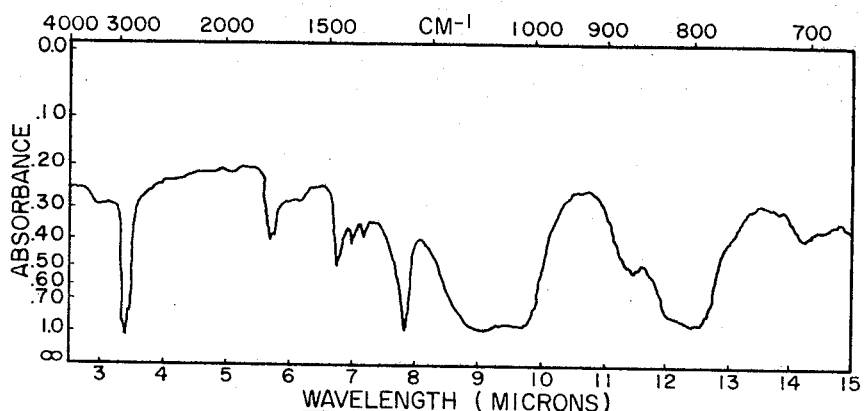
FIG. 4 INFRARED ABSORPTION SPECTRUM HALOMICIN B
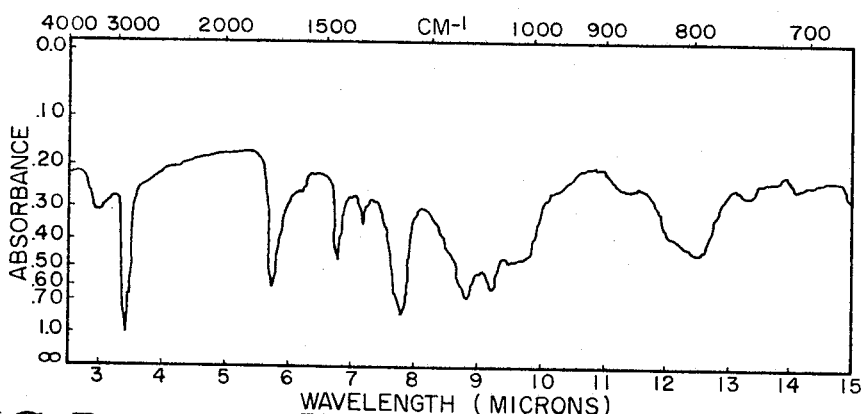
FIG. 5 INFRARED ABSORPTION SPECTRUM HALOMICIN C
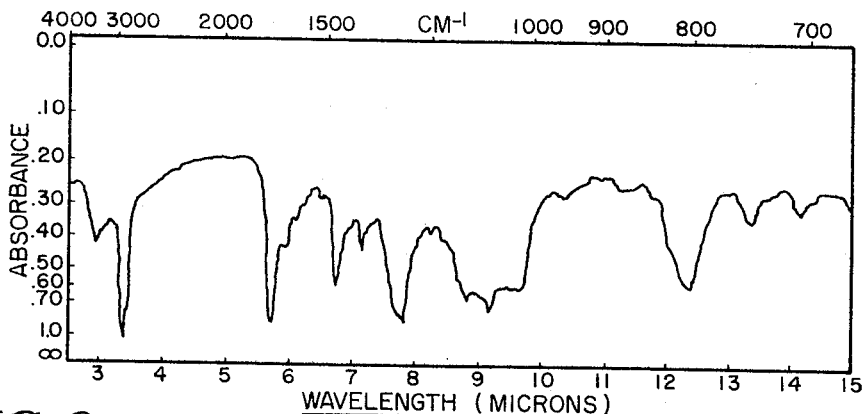
FIG. 6 INFRARED ABSORPTION SPECTRUM HALOMICIN D
INVENTORS
GEORGE M. LUEDEMANN
MARVIN J. WEINSTEIN
BY
AGENTS

3,511,909
ANTIBIOTIC HALOMICIN
George M. Luedemann, Glen Ridge, and Marvin J. Weinstein, East Brunswick, N.J., assignors to Schering Corporation, Bloomfield, N.J., a corporation of New Jersey
Continuation-in-part of applications Ser. No. 211,806, July 23, 1962, and Ser. No. 354,168, Mar. 23, 1964. This application Oct. 21, 1968, Ser. No. 769,122
Int. Cl. A61k 21/00
U.S. Cl. 424—115                                  9 Claims

ABSTRACT OF THE DISCLOSURE

Halomicin is an antibiotic complex produced by the fermentation of either *Micromonospora halophytica* var. *halophytica* or *Micromonospora halophytica* var. *nigra* under controlled aerobic conditions. Halomicin is known to consist of at least four components; said components being herein designated halomicin A, halomicin B, halomicin C and halomicin D. Each of the foregoing components exhibits a broad range of antibiotic activity and is especially active against gram positive bacteria including clinical isolates.

---

This application is a continuation-in-part of our copending applications Ser. No. 211,806 filed July 23, 1962 (now abandoned) and Ser. No. 354,168, filed Mar. 23, 1964 (now abandoned).

This invention relates to new and useful antibiotics and to methods for their manufacture. More particularly, this invention relates to new antibiotic, processes for the production thereof and methods for concentration, purifying and isolating same.

The antibiotics of this invention are formed by cultivation under controlled conditions of a hitherto undescribed species of the genus Micromonospora of the order Actinomycetales. The antibiotics of the instant invention adversely affect the growth of a wide variety of microorganisms and are, therefore, useful as a bacteriostatic component in wash solutions such as are used to clean surgical equipment, military mess halls, laboratory glassware and the like.

The microorganism

The microorganism useful for the preparation of the antibiotics of this invention is a species of Micromonospora designated herein as *Micromonospora halophytica* var. *halophytica*. The organism is also sometimes referred to as *Micromonospora halophytica* nov. sp.

A natural color variant of the foregoing microorganism is also useful for the preparation of antibiotics of this invention. The variant is designated herein as *Micromonospora halophytica* var. *nigra*. However, for the sake of simplicity the microorganism and its variant are referred to herein generically as *M. halophytica* except in those instances wherein the reference relates to taxonomy or wherein the use of the generic expression would give rise to inaccuracies. The organism and its variant exhibit taxonomical differences of sufficient magnitude to be distinguishable. Therefore, in that part of the disclosure relating to taxonomy a separate treatment of each is presented.

The microorganism and the variant thereof were isolated from a salt pool in the vicinity of Syracuse, N. Y.

Viable cultures of *M. halophytica* have been deposited and made a part of the stock culture collection of the United States Department of Agriculture, Northern Utilization Research and Development Division, Peoria, Ill. where *M. halophytica* var. *halophytica* was assigned the number NRRL 2998 and *M. halophytica* var. *nigra* was assigned the number NRRL 3097. Sub-cultures of *Micromonospora halophytica* var. *halophytica* NRRL 2998 and *Micromonospora halophytica* var. *nigra* NRRL 3097 are freely available from the above-named agency upon the presentation of an appropriate request therefor.

For isolating the microorganisms, a portion of the dried mud sample is shaken in sterile distilled water and after making suitable dilutions, the suspension is plated on screen agar medium containing 0.5% tryptose, 2.0% soluble starch, 0.3% calcium propionate, 2.0% agar all in distilled water.

The cultures are tested for antibiotic activity by first growing in the following medium for up to 60 days at 26° C.: 0.3% beef extract, 0.5% tryptose, 0.1% dextrose, 2.4% soluble starch, 0.5% yeast extract, 1.5% agar, all in tap water. The whole aqueous agar is then extracted with butanol and the butanol-water extract is concentrated. Sufficient antibiotic is extracted by the butanol-water mixture to provide a concentrate, which, by disc test inhibits the growth of *Staphylococcus aureus* and *Bacillus subtilis*. Antibiotic activity against the same organisms is observed after growth in submerged fermentation for 96 hours in an aqueous medium such as one containing 1% NZ Amine Type A (Sheffield Chemical Co. Norwich, N.Y.) and 5% soluble starch (Difco-Difco Laboratories, Inc., Detroit, Mich.).

Colony observations, set forth in Table I which follows were made on *M. halophytica* var. *halophytica* and *M. halophytica* var. *nigra* after 14 days incubation at 24–26° C. in the designated media. In describing the color formations, the following system and references are employed: The color designation consists of two designators. The first is a color name taken from the "Descriptive Color Name Dictionary," by Taylor, Knoche and Granville, published by the Container Corporation of America, 1950 (U.S.A.), with a color chip number corresponding to the color name; said chip number taken from the "Color Harmony Manual," 4th Edition, 1958, published by the Container Corporation of America, U.S.A. The second designate, consists of a color-name and number which refers to the synonym or near synonym found in the National Bureau of Standards, Circular 533, Nov. 1, 1955 (U.S.A.).

TABLE I.—COLONY OBSERVATIONS ON VARIOUS MEDIA

| Medium | Observations | |
|---|---|---|
| | *M. Halophytica* var. *halophytica* | *M. Halophytica* var. *nigra* |
| Bennett's agar plus 0.1% CaCO₃ | Growth: fair; plicate convolute Color copper g5LC; brownish orange, 54. | Growth: good; plicate Color: lugga ge tan g4NE; strong brown, 55. |
| Emerson's agar plus 0.1% CaCO₃ | Growth: good; plicate Color: copper-g5LC; brownish orange, 54. | Growth: good; crenate-convolute Color: sepia brown g3PN; dark yellowish brown, 78. |
| Tomato paste oatmeal agar plus 0.1% CaCO₃ | Growth: good; plicate Color: periphery, terracotta g5PE; strong brown, 55 center, light brown g4NG; strong brown, 55. | Growth: good; plicate Color: terracotta g5PE; strong brown, 55. |
| Glucose asparagine agar plus 0.1% CaCO₃ | Growth: fair to poor; flat Color: orange g4LA; strong orange, 50. | Growth: fair; flat Color: orange g4LA; strong orange, 50. |
| Glucose yeast extract agar—0.5% yeast; 1.0% dextrose; 0.1% CaCO₃ | Growth: good; plicate Color: light spice-brown-g4LG; moderate brown, 58. | Growth: good; plicate Color: terracotta g5PE; strong brown, 55. |

*M. halophytica* var. *halophytica* is characterized by a long branched mycelium of approximately 0.5 microns in diameter and abundant sporulation. The spores are ellipsoidal to spherical and average 1.2 microns in the large diameter. In older cultures, they appear smooth walled and dark colored. The spores appear to be born randomly along the mycelial length on short or long sporophores; the spores are occasionally sessile. The vegetative mycelium does not normally break up into polymorphic elements but appears to retain its integrity. The mycelium is non-acid fast and gram-positive.

Growth characteristics of *M. halophytica* var. *halophytica* were observed on various media as follows: potato slice—poor, carrot slice—poor, Czapek's agar—fair to poor (flat); color: oak brown—g4PI; strong brown—55, tyrosine agar—(observations at 2, 7 and 14 days) fair (slightly raised and ridged, no color reaction), peptone—iron agar—(observations at 2, 7 and 14 days)—fair (no color reaction).

*M. halophytica* var. *halophytica* is capable of utilizing various carbon and nitrogen sources. For determination of carbon utilization a visual estimate is made of its growth on agar plates in media consisting of 0.5% yeast extract, (Difco), 1.5% agar and 1% of the test carbohydrate all in distilled water. Observable growth is good in media containing the following carbohydrate component: arabinose, glucose, galactose, lactose, levulose, mannose, melibiose, starch, sucrose, trehalose, or xylose but poor in media containing one of the following: adonitol, cellulose, dulcitol, rhamnose, inositol, mannitol, ribose or sorbitol. (Poor growth is observed in a control medium containing only 0.5% yeast extract.)

Nitrogen utilization is similarly determined by visual estimate of growth on agar plates in a medium consisting of 1% glucose, 1.5% agar and 1% of the particular nitrogen source, all in distilled water. Growth is poor in media containing ammonium or sodium nitrate, asparagine or glutamic acid. With 1% NZ amine type A plus 1% glucose growth is fair with the colony raised and ridged. The colony color is burnt-orange-g5NC, strong reddish orange—35. When the nitrogen source is 0.5% Difco yeast extract, growth is good, plicate with the colony being lt. spice brown—g4LC; moderate brown—58.

In other tests it is observed that the *M. halophytica* var. *halophytica* liquifies gelatin, digests milk, utilizes sucrose, hydrolyzes starch, decomposes cellulose, reduces nitrate and grows aerobically in a temperature range of 18–40° C. but not at 50° C.

*M. halophytica* var. *halophytica* is further characterized by good growth within the pH range of 6.8–7.8. The colonies on many natural agar media are initially orange but turn some shade of brown with age (20 days). Light brown (tan), orange-brown, brown are common color variations. The colony rarely becomes dark brown, never black. Sporulation is abundant, particularly in older brown colored colonies. A reddish-brown diffusible pigment is usually produced on an agar composed of 0.5% yeast extract and 1% of any of the following sugars: galactose, lactose, levulose, mannose, raffinose, or trehalose. *M. halophytica* var. *halophytica* appears to grow to a certain degree on raffinose.

Culture characteristics of *M. halophytica* var. *nigra* as observed on common laboratory media are as follows: potato slice—growth sparse, represented by several large macro-colonies which develop from an inoculum otherwise showing no growth; carrot slice—growth poor; Czapek's agar—growth fair, plicate; color, chocolate brown g4PN, dark brown—59; tyrosine agar—growth fair, no color reaction; peptone—iron agar, growth fair, no color reaction.

On an agar medium composed of 1 percent NZ amine type A plus 1 percent glucose and 0.1 percent $CaCO_3$ growth is fair, weakly plicate. Colony color is terracotta g5P$_3$, strong brown—55, when the nitrogen source is 0.5 percent Difco yeast extract, growth is good, plicate and color is also terracotta g5PE, strong brown—55.

*M. halophytica* var. *nigra* growth well within the pH range of 6.8–7.8. The colonies on many natural agar media are initially orange but as sporulation progresses turn olive brown and eventually black. The copious black sporulation layer typical of this culture on many media easily distinguishes it from the light brown to brown sporulation layer present in *M. halophytica* var. *halophytica*. Also *M. halophytica* var. *nigra* fails to produce the reddish-brown diffusible pigment produced on certain media by *M. halophytica* var. *halophytica*. The typical black sporulation layer produced by *M. halophytica* var. *nigra* is commonly found on plates containing the following carbohydrates in the carbohydrate utilization study: D-fructose, D-galactose, B-lactose, raffinose and D-trehalose.

Also the invention as set forth herein describes the use of *M. halophytica*, and the antibiotics produced thereby, it is to be understood that the invention is not so limited as to exclude the use of variants and mutants thereof; said variants and mutants produced from the described organisms by mutating agents such as high frequency radiation (X-ray, ultra-violet), actinophages, nitrogen mustards and the like.

The antibiotic

The microorganisms described heretofore, by the controlled fermentation methods described herein, produce antibiotics which are found in both the broth and the mycelium. It is preferred that only the broth be utilized as the source of antibiotics following separation of the broth from the mycelium. By paper chromatographic studies, in several systems, the produced antibiotics appear to be a single substance, however, resolution into as many as four fractions occurs when certain chromatographic systems are employed.

In application Ser. No. 211,806, the composition of matter produced by *M. halophytica* var. *halophytica* is referred to as SP-30 (or SP-14 or 803/SP-14) the components being referred to as SP-30A, SP-30B, SP-30C and SP-30D, respectively.

In application Ser. No. 354,168, the composition of matter produced by *M. halophytica* var. *nigra* is referred to as No. 467.

We have now determined that SP-30 is substantially the same antibiotic mixture as is 467; the mixtures differing one from the other only with regard to very minor components which may be present in one but not the other. When the complex obtained from the fermentation of the variant *M. halophytica* var. *halophytica* is resolved into its principle individual components, said components are found to be identical to those obtained from the resolution of the complex produced by the fermentation of the variant *M. halophytica* var. *nigra*. The complex produced by either variant is deemed to be essentially one and the same and is identified herein as halomicin. The individual components are hereinafter called halomicin A, halomicin B, halomicin C, and halomicin D, respectively with halomicin D being least polar.

In order to form halomicin, *M. halophytica* var. *halophytica* is grown at a suitable temperature of 25° C. to 40° C., under submerged aerobic conditions in an aqueous medium containing an assimilable carbon and nitrogen source. Suitable nitrogen sources include both organic and inorganic nitrogen, preferably the former, such as soybean meal, peptones and the like. Suitable carbon sources include carbohydrates such as starch, dextrin, sugars and the like.

The fermentation is carried out for about 96 to 120 hours at a pH of about 6.5 to 8.0. At about the end of this period, peak antibiotic production has been attained. The mycelium is removed by filtration, and the antibiotic complex, halomicin, is separated from the broth by solvent extraction as described herein.

The antibiotic complex is first isolated from the broth-extraction solvent by evaporation of the solvent to a residue. The residue is examined by paper chromatography. The paper chromatograms are run in different solvent systems and $R_F$ values for the components are determined by standard bioautographic methods which comprises developing and drying a paper chromatogram which is then overlaid on an agar plate seeded with S. aureus. After a contact time of 15 minutes, the paper is removed from the plate which is then incubated at 37° C. for 16–20 hours. Observations of the location of inhibition zones permits determination of $R_F$ values of the antibiotically active components.

In Table II which follows, there is set forth $R_F$ values of components of the halomicin complex in various solvent systems.

TABLE II

Chromatographic studies on antibiotics produced by fermentation of M. halophytica var. halophytica and M. halophytica var. nigra

| Systems: | $R_F$ value of major spots |
|---|---|
| A—descending | 0.0, 0.35, 0.60, 0.75 |
| B—ascending | 1.0 |
| C—ascending | 0.78–1.0 |
| D—ascending | 0.95 |
| E—ascending | 1.0 |
| F—ascending | 1.0 |
| G—ascending | 1.0 |
| H—descending | 0.0, 0.1, 0.9 |

Systems (A) Benzene:chloroform (93.7 by volume) saturated with formamide. Chromatographic paper, prior to use, is dipped in 25% methanolic formamide, blotted and air dried for 5 minutes to remove methanol, 2 hours.

(B) Benzene:methanol (9:1).

(C) Methanol:water (80:20) containing 3% sodium chloride. The paper is buffered with a solution of 0.95 M sodium sulfate +0.05 M sodium bisulfate and dried prior to developing, 4–6 hours.

(D) Propanol:acetic acid:water (50:5:40) 18 hours.

(E) Butanol:acetic acid:water (4:1:5), 18 hours.

(F) propanol:pyridine:acetic acid:water (15:10:3:12), 18 hours.

(G) Phenol:water (80 g.: 20 ml.), 18 hours.

(H) Benzene:petroleum ether:acetone (10:2.5:5), 1–2 hours.

The observed $R_F$ values, set forth in Table II, differentiate the antbiotics from all other known antibiotics including oleandomycin, novobiocin, penicillin G, erythromycin and gentamicin. Halomicin from either the microorganism or its variant in all but one of the solvent systems employed exhibits substantially the same migration patterns.

In the examples which follow are illustrated suitable methods for fermenting M. halophytica var. halophytica extracting the antibiotics from the broth and isolating halomicin. Assay values are determined by standard disc assay methods against S. aureus.

EXAMPLE 1

Shake flask fermentation of M. halophytica var. halophytica germination stage.—Add a lyophilized culture of M. halophytica var. halophytica to a 300 ml. shake flask containing 100 ml. of the following sterile medium:

Beef extract—3 grams
Tryptone—5 grams
Dextrose—1 gram
Soluble Starch—24 grams
Yeast extract—5 grams
Water to 1 liter.

Incubate on a rotary shaker (280 r.p.m., 2 inch stroke) for 5 days at 37° C.

Fermentation stage.—Transfer a 25 ml. inoculum from the germination stage to each of four 2 liter flasks, each containing 500 ml. of the following medium:

Soluble starch—50 grams
N–Z amine Type A—10 grams
Soft water to 1 liter
pH after sterilization—7.45

Incubate the flasks and their contents for 96 to 120 hours at 28° C. on a rotary shaker.

M. halophytica var. nigra is germinated and fermented in the same manner as the above. Sometimes it is advantageous to employ a second germination stage whereby a 25 ml. inoculum from the germination stage is asceptically transferred to 500 ml. of the germination medium and shaken as above for 72 hours.

An alternate fermentation stage procedure is that wherein there is utilized 500 ml. of a growth medium comprising soybean meal 30 g. dextrose 40 g., calcium carbonate 5 g., tap water 1000 ml. to which is added a 25 ml. inoculum from the germination stage. Each of four 2 liter flasks containing the foregoing is incubated at 28° C. for five days on a rotary shaker.

EXAMPLE 2

Tank fermentation of M. halophytica var. halophytica germination stage.—Add a lyophilized culture of M. halophytica var. halophytica to a 300 ml. shake flask containing 100 ml. of the following sterile medium set forth in Example 1 (germination stage).

Incubate on a rotary shaker (280 r.p.m., 2″ stroke) for five days at 37° C.

Inoculum preparation stage.—Transfer a 25 ml. inoculum from the germination stage to each of four 2 liter flasks, each containing 500 ml. of the sterile medium utilized for germination. Incubate the flasks and contents for 5 days at 28° C. on a rotary shaker (280 r.p.m., 2″ stroke). Pool the contents of the flasks. Add a 25 ml. inoculum (taken from the pool) to each of ten 2 liter flasks, each containing 500 ml. of the aforedescribed sterile medium. Incubate the flasks and their contents for 3–5 days at 28° C. on a rotary shaker (280 r.p.m., 2″ stroke). Pool and aseptically transfer the broth into a sterile inoculum flask having a side arm (total volume—about 5 liters).

Fermentation stage.—Aseptically transfer the 5 liters of inoculum to a 35 gallon fermenter containing 25 gallons of the following sterile medium:

Soluble starch—4500 grams
NZ amine Type A—900 grams
GE-60 (antifoam)—100 milliliters
Soft water to 90 liters Aerobically ferment for 55–65 hours (until the packed cell volume (PCV) is about 4.5–5.0% as determined by centrifuging a 10 ml. sample at 2800 r.p.m. for 5 minutes) under the following conditions:

Temperature—26° C.
Sterile air input—2.7–2.8 cu. ft./min.
Pressure—7–8 p.s.i.g.
Agitation—160–165 r.p.m.

The following data is typical of such a fermentation run:

| Hours growth: | Temp., °C | Air, c.f.m. | P.s.i.g. | R.p.m. | pH | PCV ml. | Disc assay against Staph. aureus |
|---|---|---|---|---|---|---|---|
| 0 | 26 | 2.7 | 7.0 | 160 | 6.80 | | |
| 8 | 26 | 2.7 | 7.8 | 160 | 6.95 | 0.10 | |
| 16 | 26 | 2.7 | 7.5 | 160 | 6.85 | 0.10 | |
| 23 | 26 | 2.7 | 7.4 | 160 | 7.10 | 0.15 | 14 mm. zone. |
| 31 | 26 | 2.7 | 7.5 | 160 | 7.35 | 0.15 | |
| 38 | 26 | 2.8 | 7.0 | 165 | 7.60 | 0.25 | |
| 46 | 26 | 2.8 | 7.7 | 165 | 7.75 | 0.25 | 21 mm. zone. |
| 54 | 26 | 2.8 | 7.4 | 165 | 7.90 | 0.45 | |
| 65 | 26 | 2.8 | 7.2 | 165 | 7.80 | 0.50 | 25 mm. zone. |

EXAMPLE 3

(A) Extraction of halomicin from laboratory fermentation of *M. halophytica* var. *halophytica*

To 3.5 liters of the pooled fermentation from two runs according to Example 1, add a filter aid (diatomaceous earth) and filter. Wash the cake with several hundred milliliters of water and add the washes to the filtrate. (Total volume about 3,600 ml.) Add an equal volume of ethyl acetate and stir for 30 minutes. Separate the ethyl acetate layer and again extract the aqueous layer with an equal volume of ethyl acetate. Pool the extracts and concentrate on a film evaporator in vacuo to a residue. The residue weights about 4 grams and, on agar plates, exhibits antibiotic activity against *Staph. aureus* ATCC 209P down to 1 mcg./ml.

(B) Extraction of halomicin from laboratory fermentation of *M. halophytica* var. *nigra*

Filter the 40 liters of fermentation broth obtained from the pooling of 20 runs of fermentation of *M. halophytica* var. *nigra* according to Example 1. Wash the cake with water and combine filtrates obtaining about 40 liters. Extract twice with equal volumes of ethyl acetate (40 liters each) and concentrate. Take up the dark oil in 100 ml. of ethyl acetate and add it slowly to 1 liter of ethyl acetate-petroleum ether (1:1) while stirring. Filter. Concentrate the filtrate to a residue (5.2 g. of dark brown oil). Add to the oil 150 ml. of benzene-chloroform (1:1) and filter. Add the filtrate slowly with stirring to 1.5 liters of hexane. Filter the precipitate, wash with hexane and dry in vacuo obtaining 1.12 gms. of halomicin as an amorphous powder which exhibits (on agar plates) antibiotic activity against *S. aureus* (ATCC 209P) down to 0.1 mcg./ml., *Streptococcus faecalis* 1 mcg./ml. and *B. subtilis* 10 mcg./ml.

EXAMPLE 4

Extraction of halomicin from tank fermentation

Separate the mycelium from the broth by filtration utilizing a filter aid. Extract 90 liters of the harvest broth with two volumes of ethyl acetate after first adjusting the pH to 7.0. Concentrate the extract to 3 liters in vacuo. Remove the water layer which separates on standing and concentrate the ethyl acetate solution further to approximately 200 ml. Chill the concentrate overnight and filter. Add the filtrate to 10 volumes of petroleum ether-ethyl ether (1:1) and filter. Wash the precipitate with several portions of solvent mixture and add the washes (petroleum ether-ethyl ether) to the filtrate. Concentrate the filtrate plus washings containing the antibiotics in vacuo to a residue consisting of a dark brown oil weighing 18 g. which inhibits the growth of *Staph. aureus* 209P, on agar at dilutions as low as 1 mcg./ml.

EXAMPLE 5

Resolution of halomicin into its fractional components

Resolution of halomicin into its components is effected by column chromatographic separation utilizing a purified diatomaceous earth (Chromosorb W, Johns Manville and Company, U.S.A., non-acid washed, mesh size 60–100) as an inert support and carrier.

Prepare a glass column (0.5 in. diameter x 12 in. height) by packing with a suspension of Chromosorb W in formamide. Admix a small portion of Chromosorb W with 1 ml. of a methanolic solution containing 408 mg. of halomicin obtained in Example 4. Dry the mixture under vacuum to remove methanol and then carefully pack on top of the prepared column.

Elute the column in turn with 100 ml. of the following solvent mixtures:

(a) benzene:chloroform (95:5) saturated with formamide
(b) benzene:chloroform (90:10) saturated with formamide
(c) benzene:chloroform (75:25) saturated with formamide
(d) benzene:chloroform (50:50) saturated with formamide
(e) benzene:chloroform (25:75) saturated with formamide Next elute the column with 600 ml. of chloroform and finally with 1000 ml. of methanol. A total of 81 fractions are obtained in 25 ml. portions. Bioautograph each 25 ml. portion against *Staph. aureus* A.T.C.C. 6538P and pool those portions showing similar antibiotic activity and components. Concentrate each pool in vacuo, add water and extract each pool with chloroform. Concentrate each chloroform extract separately to dryness. The residues obtained from each pool are bioautographed as before against *Staph. aureus* and components identified by position. Activity is determined by standard disc method utilizing a 6.3 mm. diameter disc impregnated with the antibiotic and placed in a petri dish seeded with *Staph. aureus*.

The results of an experiment such as described above are set forth in the following Table III:

TABLE III

| Eluate portion: | Pool No. | Component content |
|---|---|---|
| 1 | A | None. |
| 2–5 | B | D (trace). |
| 6–16 | C | D, C (trace). |
| 17–23 | D | C, D (trace). |
| 24–43 | E | C. |
| 44–46 | F | C, E. |
| 47–57 | G | E, C (trace). |
| 58–80 | H | None. |
| 81 | I | A, B (trace), C (trace) |

Column chromatograph of the halomicin complex prepared in Example 3 is essentially as described above for that of Example 4 and results in fractionation into the major components shown in Table II, system A.

Physical and chemical properties of halomicin

Halomicin is soluble in most common organic solvents but has minimal solubility in water. The antibiotic complex is easily extracted from the fermentation broth at a pH of 2 to 9.5 by utilizing such solvents as ethers, esters, halogenated hydrocarbons, aromatic hydrocarbons and immiscible alcohols. Exemplary of the foregoing are such solvents as diethyl ethyl, di-isobutyl ether, ethyl acetate, amyl acetate, chloroform, carbon tetrachloride, benzene, toluene, butanol and the like.

Where subjected to certain qualitative chemical tests, halomicin exhibits the following actions: Ninhydrin and Sakaguchi tests—negative. Reducing sugar (ammoniacal silver nitrate)—positive, reduction of ferricyanide—positive.

When halomicin is resolved into its components, as in Example 5 above, the components (i.e. halomicin A, halomicin B, halomicin C and halomicin D) exhibit the physical and chemical properties described below:

Fraction A is stable at room temperature in admixture with an aqueous buffer at pH range of 2–10. Upon heating at 100° C., the antibiotic activity diminishes as the pH is lowered below 6. Activity is destroyed at pH 2 by heating at 100° C., for 30 minutes while no loss in activity is observed under similar conditions at pH 7 and above.

Fraction B is stable at pH 2–10 at room temperature. At elevated temperature (100° C.) it is stable down to pH 2 at 100° C. for 30 minutes at which point activity decreases.

Fraction C is stable over the pH range of 2–10 even at 100° C. for 30 minutes.

Fraction D is stable from pH 2–10 at room temperature and pH 4–10 at 100° C. for 30 minutes.

When subjected to certain qualitative chemical tests, halomicin and its fractions exhibit the following actions: Ninhydrin and Sakaguchi tests—halomicin and all fractions negative. Reducing sugar (ammoniacal silver nitrate) Fraction B, C and D—negative, halomicin—positive, Fraction A strongly positive. Reduction of ferricyanide—halomicin, Fraction B, C and D—positive, Fraction A—negative.

Halomicin and its fractional components in methanol absorb ultra-violet light in the range of 220–400 m$\mu$ with the following specific characteristics:

Halomicin has a rather non-descript absorption curve with inflection points at 260 m$\mu$ and 290 m$\mu$, the point at 260 m$\mu$ having an $\epsilon^{1\%}$ of about 28. Fraction A has a similar type curve with an inflection at 258 m$\mu$ ($\epsilon^{1\%}$ about 70) and a second inflection at about 295 m$\mu$. Fraction B exhibits a maximum at 268 m$\mu$ ($\epsilon^{1\%}$ about 111). Fraction C shows no maxima but an inflection at 265 m$\mu$ ($\epsilon^{1\%}$ about 181) and a second inflection at about 290 m$\mu$. Fraction D exhibits a maximum at 263 m$\mu$ ($\epsilon^{1\%}$ about 115).

The infra-red spectrum of halomicin is shown in FIGS. 1 and 2 and Fraction A, Fraction B, Fraction C and Fraction D, respectively, in mineral oil mull (Nujol) are shown by FIGS. 3, 4, 5 and 6 respectively. The absorption peaks and band characteristics are set forth in the following tabulations: (W=weak, M=moderate, M–S=moderate to strong, S=strong; sh.=shoulder).

The infra-red spectrum halomicin in mineral oil mull (Nujol) is shown by FIGS. 1 and 2. The absorption peaks and band characteristics are set forth in the following tabulations: (W=weak, M=moderate, M–S=moderate to strong, S=strong, sh.=shoulder).

Halomicin produced by *M. Halophytica* var. *Halophytica*

(See FIG. 1)

| $\lambda(\mu)$ | Peak strength |
|---|---|
| 2.98 | S |
| 5.78 | S |
| 6.00 | M–S (broad) |
| 6.58 | W |
| 6.81 | M–S |
| 7.02 | W (sh.) |
| 7.22 | M |
| 7.71 | M–S (sh.) |
| 7.83 | S |
| 8.32 | W (sh.) |
| 8.86 | M–S |
| 9.28 | M–S |
| 9.54 | Broad |
| 9.75 | Broad |
| 13.42 | M |
| 14.20 | W (broad) |

Halomicin produced by *M. Halophytica* var. *nigra*

(See FIG. 2)

| $\lambda(\mu)$ | Peak strength |
|---|---|
| 2.98–3.15 | S (broad) |
| 3.65 | M–W (broad) |
| 5.77 | M–W |
| 5.83 | M–W |
| 6.02 | M–S |
| 6.05 | M–S |
| 6.07 | M–S |
| 6.13 | Sh. |
| 6.18 | S |
| 6.30 | Sh. |
| 6.37 | M |
| 6.45 | M |
| 6.58 | M–S |
| 7.85–7.95 | S (broad) |
| 8.05 | S |
| 8.20 | Sh. |
| 8.35 | Sh. |
| 8.45 | Sh. |
| 8.52 | M–S |
| 8.65 | Sh. |
| 9.43 | M–S |
| 9.55 | M–S |
| 9.80 | Sh. |
| 10.25 | M–W |
| 11.15–11.25 | W (broad) |
| 11.95 | W |
| 13.15 | M–S |
| 13.80–13.90 | M–W (broad) |

Fraction A—

(See FIG. 3)

| $\lambda(\mu)$ | Peak strength |
|---|---|
| 2.95 | S (broad) |
| 3.42 | M |
| 5.82 | S (sh.) |
| 5.89 | S |
| 6.15 | M (sh.) |
| 6.06 | W |
| 6.08 | W |
| 7.16 | M–S |
| 7.56 | M (broad) |
| 8.50 | W |
| 9.22 | W |
| 9.46 | W |

Fraction B—

(See FIG. 4)

| $\lambda(\mu)$ | Peak strength |
|---|---|
| 2.98 | W (broad) |
| 5.72 | M–S |
| 5.80 | M–S |
| 6.79 | M–S |
| 7.15 | M–S |
| 7.21 | M–S |
| 7.88 | S |
| 8.70 | S (broad) |
| 10.00 | S (broad) |
| 11.51 | M–S |
| 12.00 | S (broad) |
| 13.00 | S (broad) |

Fraction C—

(See FIG. 5)

| $\lambda(\mu)$ | Peak strength |
|---|---|
| 2.95 | W (broad) |
| 5.74 | S |
| 6.20 | W (sh.) |
| 6.79 | M–S |
| 7.20 | M |
| 7.70 | S (sh.) |
| 7.82 | S |

| | |
|---|---|
| 8.85 | S |
| 9.28 | S |
| 9.56 | M |
| 9.60 | M (broad) |
| 9.90 | M (broad) |
| 11.50 | W (broad) |
| 12.00 | M-S (broad) |
| 12.80 | M-S (broad) |
| 13.35 | W (broad) |
| 14.15 | W (broad) |

Fraction D—
(See FIG. 6)

| $\lambda(\mu)$: | Peak strength |
|---|---|
| 2.95 | M |
| 5.75 | S |
| 6.00 | M(sh.) |
| 6.16 | W(sh.) |
| 6.30 | W(sh.) |
| 6.56 | W(sh.) |
| 6.78 | M-S |
| 7.20 | M |
| 7.28 | W(sh.) |
| 7.70 | S(sh.) |
| 7.80 | S(sh.) |
| 7.88 | S |
| 8.32 | W |
| 8.52 | W(sh.) |
| 8.88 | S |
| 9.28 | S |
| 9.42 | M-S(broad) |
| 9.56 | M-S(broad) |
| 9.72 | M-S(broad) |
| 10.44 | W |
| 11.30 | W(broad) |
| 11.60 | W(broad) |
| 11.82 | W(sh.) |
| 12.42 | S |
| 13.32 | M(broad) |
| 13.48 | M(broad) |
| 14.20 | M(broad) |

Biological properties of halomicin

The antibiotics comprising the halomicin complex possess a broad range of activity against gram-positive organisms. They have particular values in combatting manifestations of penicillin resistant microorganisms since these novel antibiotics are capable of inhibiting or destroying such organisms. They are also useful in treating diseases caused by Staph. aureus, Diplococcus pneumoniae, Streptococcus pyogenes and other pathogenic microorganisms. In addition these antibiotics are useful as laboratory sterilization aids in eliminating overgrowth of gram positive organisms from equipment being used to study growth of gram-negative organisms.

The comparative in vitro activity of halomicin against a variety of gram-positive organisms is set forth in Table IV which follows. The susceptibility of the microorganisms to the antibiotic was determined by the standard tube dilution method. In each instance $10^{-5}$ dilution of a 24 hour broth culture was employed as inoculum with the end points taken after incubation for 24 hours at 37° C. Except where indicated the growth medium consisted of tryptose phosphate broth. The antibiotics used in these tests are those obtained in Example 4. Halomicin has a potency of 4,000 dilution units per milligram or a potency of 18,000 dilution units per milligram depending upon the fermentation and isolation conditions. (As a base line for activity, 1 mg. of the product of Example 4 is dissolved in 1 ml. of the solvent and after a 4,000-fold dilution or an 18,000-fold dilution still inhibits the growth of Staphylococcus aureus (ATCC 6538P) in tryptose phosphate broth medium using the inoculum previously described.)

TABLE IV.—ANTIBIOTIC SPECTRA OF HALOMICIN

| Microorganism | Minimum inhibitory concentration ($\gamma$/ml.) antibiotic source |
|---|---|
| Bacillus cereus var. mycoides, ATTC-7064 | 6.0 |
| Bacillus cereus var. mycoides, DA-39 [1] | 0.75 |
| Bacillus cereus var. mycoides, DA-30 | 12.0 |
| Bacillus megatherium, DA 31 | 0.25 |
| Bacillus megatherium, DA-36 | 3.0 |
| Bacillus megatherium, DA-35 | 6.0 |
| Bacillus sphaericus, DA-32 | 2.0 |
| Bacillus sphaericus, DA-33 | 1.0 |
| Diplococcus pneumoniae, DA-999 | 0.075 |
| Staphylococcus albus, DA-40 | 0.75 |
| Staphylococcus aureus, ATCC-6538 | 0.25 |
| Staphylococcus aureus, ATCC-6538P | 0.25 |
| Staphylococcus aureus, ATCC-12715 | 2.0 |
| Staphylococcus aureus, ATCC-1163 | 1.0 |
| Staphylococcus aureus, ATCC-9996 | 0.75 |
| Staphylococcus aureus var. Gray | 0.25 |
| Staphylococcus aureus var. Smith, DA-141 | 0.25 |
| Staphylococcus epidermidis, DA-41 | 0.25 |
| Sarcina lutea, ATCC-9341 | 0.75 |
| Micrococcus flavus, DA-60 | 0.05 |
| Streptococcus pyogenes C, DA-21 | 0.025 |
| Streptococcus fecalis, ATCC-10541 | 16.0 |
| Escherichia coli, DA-110 | 16.0 |
| Escherichia intermedia, DA-111 | 2.0 |
| Mycobacterium smegmatis, DA-150 | 4.0 |

[1] DA refers to Schering Corp., Bloomfield, New Jersey, private collection.

The in vivo activity of Halomicin against certain bacterial infections in mice has been tested. The mice were infected with an inoculum of the particular bacteria administer by intraperitoneal injection. They were then treated by subcutaneous injections of the antibiotic (potency of 4000 and 18,000 dilution units/mg.) depending upon the source of the antibiotic suspended in 0.25% aqueous carboxymethyl cellulose; the injection being administer in two divided dosages.

The antibiotic complex having a potency of 4000 dilution units/mg. protects 100% of the animals infected with S. aureus at a dose of 10 mg./mouse/day (40,000 dilution units/mouse/day). The protecting dose for 100% of the animals infected with Diplococcus pneumoniae is 15 mg./mouse/day (60,000 dilution units/mouse/day), said dosage being administer for two days.

The antibiotic complex having a potency of 18,000 dilution units/mg. has a $PD_{50}$ against S. aureus of 20 mg./kg. There is a significant delay in death in Streptococcus infected mice following administration subcutaneously or orally of 50 mg./kg. Against Diplococcus pneumoniae full protection is obtained with less than 20 mg./kg. subcutaneously.

The acute toxicity (LD/50) of halomicin (potency=4000 dilution units/mg.) measured in the standard manner utilizing mice weighing 18–20 gms. and in the dosage form of a suspension in 0.25% aqueous carboxymethyl cellulose is as follows: subcutaneous, >7500 mg./kg.; intraperitoneal, 7500 mg./kg.; intravenous, 800 mg./kg. The LD/50 for halomicin (potency=18,000) according to this method is: subcutaneous 2500 mg./kg., and intraperitoneal 1500 mg./kg.

Halomicin and its components has been tested by standard disc assay techniques against certain gram-positive organisms utilizing a 6.3 mg. disc. The disc is impregnated with a solution of the antibiotic at a particular concentration and then overlaid on an agar plate seeded with a particular organism. The whole is then incubated for 24 hours at 37° C. at which time the zone of inhibition about the disc is measured. In Table V which follows is shown the results of these tests.

TABLE V

| Antibiotic | Conc. | γ Zone of Inhibitions (mm.) against | |
|---|---|---|---|
| | | S. Aureus | St. pyogenes |
| Halomicin | 1,000 | 28 | 29 |
| | 100 | 19 | 19 |
| | 10 | 13 | 9 |
| | 1 | 9 | 0 |
| Halomicin A | 1,000 | 28 | 31 |
| | 100 | 17 | 12 |
| | | ± | 0 |
| | 1 | 0 | 0 |
| Halomicin B | 1,000 | 28 | 35 |
| | 100 | 20 | 20 |
| | 10 | 11 | ± |
| | 1 | 0 | 0 |
| Halomicin C | 1,000 | 28 | 33 |
| | 100 | 22 | 24 |
| | 10 | 17 | 14 |
| | 1 | 9 | ± |
| Halomicin D | 1,000 | 19 | 19 |
| | 100 | 13 | 10 |
| | 10 | ± | 0 |
| | 1 | 0 | 0 |

In view of the foregoing, it becomes obvious that halomicin and its components exhibit significant antibiotic activity. Accordingly, halomicin may be used in the form of the complex to treat infections caused by pathogenic bacteria, such as those set forth above. Additionally, the individual components may also be used to treat infections caused by the same bacteria wherein advantage may be taken of the differing inhibitory properties of the components against the various organisms.

We claim:

1. A method for producing an antibiotic complex, said antibiotic complex being called halomicin, which comprises cultivating a microorganism selected from the group consisting of *Micromonospora halophytica* var. *halophytica* NRRL 2998 and *Micromonospora halophytica* var. *nigra* NRRL 3097 in an aqueous nutrient medium containing an assimilable source of carbon and nitrogen, under submerged aerobic conditions at a temperature in the range of from about 25° C. to about 40° C. and at about pH 6.5 to about pH 8.0 until a composition of matter having substantial antibiotic activity is produced and isolating said antibiotic complex.

2. The method of claim 1, including the steps of resolving the antibiotic complex, halomicin, into its components, halomicin A, halomicin B, halomicin C, and halomicin D, and separating the components, one from the other, which comprises adsorbing the antibiotic complex on diatomaceous earth, selectively eluting the individual components from the diatomaceous earth and isolating said components from the eluate.

3. The method of claim 1 wherein the microorganism cultivated is *Micromonospora halophytica* var. *halophytica* NRRL 2998.

4. The method of claim 1 wherein the microorganism cultivated is *Micromonospora* var. *nigra* NRRL 3097.

5. The antibiotic complex, halomicin, made by the process of claim 1 being further characterized by: having an infrared spectrum when suspended in solid form in hydrocarbon oil substantially as shown in FIG. 1; being soluble in organic solvents other than aliphatic hydrocarbons and insoluble in water; exhibiting ultraviolet absorption inflection points at 260 mμ and 290 mμ; being qualitatively negative in the ninhydrin and Sakaguchi tests and qualitatively positive in reducing ferricyanide; and possessing an anti-bacterial spectrum including the bacteria set forth in Table IV.

6. Halomicin A, made by the process of claim 2 having the following characteristics having an infrared spectrum when suspended in hydrocarbon oil substantially as shown in FIG. 3 with characteristic peaks at 2.95, 3.42, 5.82, 5.89, 6.06, 6.08, 6.15, 7.16, 7.56, 8.50, 9.22, and 9.46μ; having an ultra-violet absorption with inflections at 258 mμ and 295 mμ; giving a strongly positive reducing sugar test using ammoniacal silver nitrate, giving negative results in the ninhydrin, Sakaguchi and ferricyanide reduction tests; being stable in buffers over the pH range of 2-10 at room temperature and at pH 7 for 30 minutes at 100° C.; and inhibiting the growth of microorganisms including those shown in Table V.

7. Halomicin B, made by the process of claim 2 having the following characteristics; having an infrared spectrum when suspended in hydrocarbon oil substantially as shown in FIG. 4 with characteristic peaks at 2.98, 5.72, 5.80, 6.79, 7.15, 7.21, 7.88, 8.70, 10.00, 11.51, 12.00 and 13.00μ; having an ultra-violet absorption with a maximum at 268 mμ; giving a negative reducing sugar test using ammoniacal silver nitrate, giving negative results in the ninhydrin and Sakaguchi tests and giving positive results in the ferricyanide reduction tests; being stable in buffers over the pH range of 2-10 at room temperature and at pH 2 for 30 minutes at 100° C.; and inhibiting the growth of microorganisms including those shown in Table V.

8. Halomicin C, made by the process of claim 2 having the following characteristics; having an infrared spectrum when suspended in hydrocarbon oil substantially as shown in FIG. 5 with characteristic peaks at 2.95, 5.74, 6.20, 6.79, 7.20, 7.70, 7.82, 8.85, 9.28, 9.56, 9.60, 9.90, 11.50, 12.00, 12.80, 13.35, and 14.15μ; having an ultraviolet absorption spectrum with inflections 265 mμ and 290 mμ; giving negative results in the ninhydrin, Sakaguchi and reducing sugar test using ammoniacal silver nitrate, giving a positive ferricyanide reduction test; being stable in buffers over the pH range of 2-10 at 100° C. for 30 minutes; and inhibiting the growth of microorganisms including those shown in Table V.

9. Halomicin D, made by the process of claim 2 having the following characteristics; having an infrared spectrum when suspended in hydrocarbon oil substantially as shown in FIG. 6 with characteristic peaks at 2.95, 5.75, 6.00, 6.16, 6.30, 6.56, 6.78, 7.20, 7.28, 7.70, 7.88, 8.32, 8.52, 8.88, 9.28, 9.42, 9.56, 9.72, 10.44, 11.30, 11.60, 11.82, 12.42, 13.32, 13.48 and 14.20μ; having an ultraviolet absorption spectrum with a maximum at 263 mμ; giving negative results in the ninhydrin, Sakaguchi and reducing sugar test using ammoniacal silver nitrate, giving a positive ferricyanide reduction test; being stable over the pH range of 2-10 at room temperature and over the pH range of 4-10 at 100° C. for 30 minutes; and inhibiting the growth of microorganisms including those shown in Table V.

References Cited

Wagman et al.: Abstracts of Papers, 7th Interscience Conference on Antimicrobial Agents and Chemotherapy, Chicago, Ill., Oct. 25–27, 1967, page 22.

Dewent Farmdoc No. 23,332, published Oct. 20, 1966, German Pat. No. 1,227,194, pages 31–39.

ALBERT T. MEYERS, Primary Examiner

J. D. GOLDBERG, Assistant Examiner

U.S. Cl. X.R.

195—80